Dec. 17, 1929.   P. C. PINKERTON   1,739,648
AUTOMOBILE LOCKING DEVICE
Filed Sept. 29, 1928
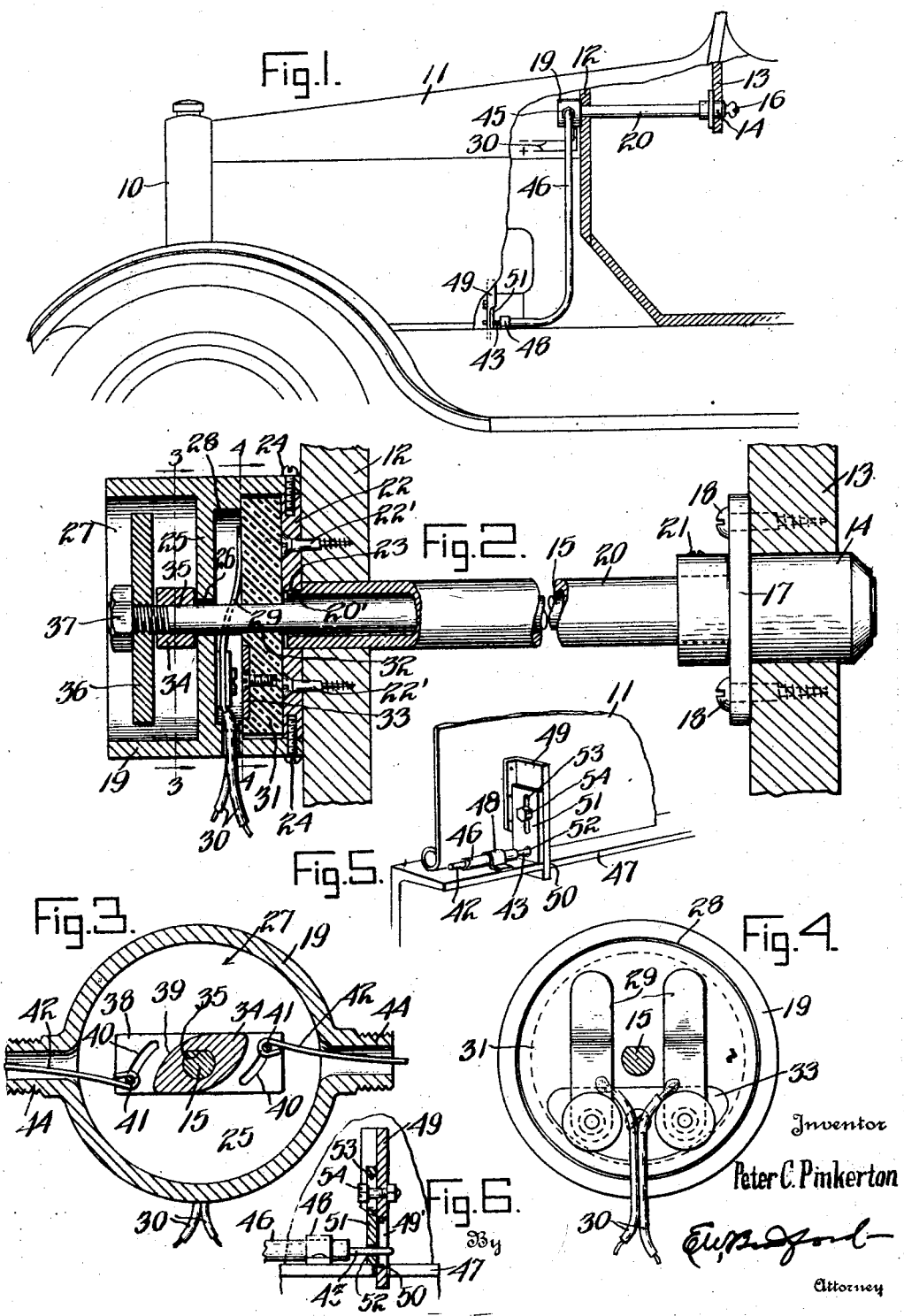
Inventor
Peter C. Pinkerton
Attorney Patented Dec. 17, 1929

1,739,648

UNITED STATES PATENT OFFICE

PETER C. PINKERTON, OF INDIANAPOLIS, INDIANA

AUTOMOBILE LOCKING DEVICE

Application filed September 29, 1928. Serial No. 309,203.

My said invention relates to a combined hood and ignition lock for automobiles and it is an object of the invention to provide a construction wherein a lock located on the instrument board within convenient reach of the driver may be manipulated to turn the ignition off or on, which will simultaneously lock the hood in position or unlock the same.

A further object of the invention is to provide a device of this character having sufficient adjustment to render it capable of adaptation to various individual makes of automobiles to which it may be applied and which renders the parts beneath the hood inaccessible and practically incapable of being jimmied or burglarized to permit operation of the machine by an unauthorized person.

A further object of the invention is to provide a commercially practical standardized construction, which will be easy to apply to any style car without changing the structure thereof and which not only can be manufactured and sold to dealers at a very small cost but can also be installed at practically negligible cost at the time the car is being assembled at the factory.

This application is filed as a substitute for and to take the place of my application No. 115,985, filed June 14, 1926, and allowed on August 17, 1927.

Referring to the accompanying drawings which are made a part hereof and on which similar reference characters indicate similar parts,—

Figure 1 is a fragmentary side elevation of an automobile with parts broken away to show the application of my invention;

Figure 2, an enlarged detail of a switch having an operating shaft extending through the dash and instrument board;

Figure 3, a section on line 3—3 of Figure 2;

Figure 4, a section on line 4—4 of Figure 2;

Figure 5, a detail of the hood locking mechanism, and

Figure 6, a detail side elevation of the structure shown in Figure 5.

In the drawings reference character 10 indicates an automobile having a hood 11, a dash 12 and an instrument board 13.

A lock 14, preferably of the tumbler type having a bolt or shaft 15 adapted to be operated by a key 16, is mounted on the instrument board 13 by means of a flange 17 through which screws 18 extend into said instrument board. The forward end of the bolt 15 extends through the dash 12 and into a casing or housing 19 secured by screws 22' to the forward face of the dash or on the opposite side of the dash from the driver. A sleeve or casing 20 is provided for protecting the locking bolt 15, said sleeve or casing being preferably heat-treated and of sufficient hardness to safeguard the same against mutilation by sawing or other ordinary instruments. The forward end of said sleeve 20 is pressed into the barrel of the lock 14 and a set screw 21 is provided for assisting in holding the sleeve in fixed relation relative to said lock.

The rear end of said sleeve 20 extends through a disk 22 secured by screws 22' on the front side of the dash from the driver which disk forms a closure for one end of the housing 19. Said disk 22 is provided with a D-shaped opening 23 and the cylindrical sleeve 20 is correspondingly machined at 20' in order to prevent relative rotation between the sleeve and the disk. A plurality of screws or other appropriate fastening elements 24 extend through the housing into the disk in spaced relation around the same for securing said disk within the housing.

The housing 19 is provided with an intermediate web 25 having a perforation 26 through its center through which perforation the end of the lock bolt 15 extends said web forming a forward compartment 27 and a rear compartment 28 in which are disposed the mechanism for making and breaking the ignition circuit and that for actuating the locking mechanisms.

Spaced spring contacts 29 are mounted within the compartment 28 on the web 25 to which are attached ignition wires 30. Said contacts are insulated from said web to prevent short circuiting. An insulated disk 31 is mounted on the bolt 15 between the disk 22 and the web and is provided with a D-shaped opening 32 corresponding to the cross section of the bolt 15 and adapted to be rotated by said bolt. The insulated disk is provided with a bridge plate 33 counter-sunk in one face thereof and adapted to engage the free ends of the contacts 29 and bridge the same to complete the electric circuit. A lever 34 having an opening 35 therethrough corresponding to the cross section of the bolt 15 is mounted on said bolt within the compartment 27 and in order to hold said lever in position I provide a disk 36 and thread the same onto the end of the bolt 15 and lock the same in position by means of a lock nut 37, though obviously instead of the disk 36, which in itself performs the function of a nut, a common nut may be provided.

The lever 34 is slotted or bifurcated at 38, the inner extremity of each slot being curved to form a cam 39. The bifurcated arms of the lever are also provided with curved slots 40 for the reception of a pin 41 having attached thereto the inner end of an operating wire or flexible connection 42 which carries a plunger or locking bolt 43 at its forward end for locking the hood in position. The lever 34 is formed the same at each end for connection with similar wires 42, the cam surfaces 39 preventing the wires from bending too sharply and breaking. The casing 19 has a threaded nipple 44 preferably formed integral therewith adapted for the reception of a nut 45 on the end of a pipe 46 of white metal or other inexpensive metal of a rigid nature, said pipe 46 extending downwardly and along the frame member or chassis 47 and secured thereto by means of clamps 48, said pipes 46 forming a casing for the flexible wire 42.

A fastening element 49 is spot welded in vertical position to the side of the hood 11, said fastening element being substantially L-shaped with its broader portion extending outwardly and its narrower portion cut away adjacent its lower end to provide a tongue slotted at 49' for the reception of the locking bolt 43. In order to accommodate the lower end or tongue of the member 49 the chassis 47 is provided with a transverse slot 50 and a plate 51 is provided with an opening 52 for reception of the locking bolt, said plate being provided with a slot 53 by means of which it may be slidably adjusted upon a bolt 54 which extends through the element 49.

In the operation of the device when the key 16 is turned the disk 31 having the bridge-plate 33 is rotated until the same completes electrical contact between the flexible contact plates 29 and at the same time the lever 34 is rotated to retract the flexible wires 42 and the locking bolts or plungers 43 from the co-operating locking elements on the hood.

The lock shaft is securely held in the end of the lock by means of a locking screw and the casing that surrounds the shaft is locked both to the lock and to the switch housing which prevents the casing and lock being rotated to operate the switch by means of a Stillson wrench or the like, said shaft being made separately in order to permit high speed production.

The switch may be substituted for the usual ignition switch or may be an auxiliary switch placed in the ignition circuit preferably between the ammeter and the coil. Also the other parts are so constructed that they are individually removable in case it becomes necessary to replace the same for any reason.

In assembling a large number of well-known automobiles it was noted that practically no two were provided with hood clamps in the same location and my adjustable locking mechanism is designed to account for any variation.

It will be understood that in a device of this character it will be practically impossible for an unauthorized person to gain access to the wiring system or parts of the motor beneath the hood to render the machine capable of being operated.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. The combination in an automobile of a hood, a lock having a shaft extending beneath said hood, a casing for said shaft, a switch casing beneath the hood adapted to be secured in fixed position, a bridge piece carried by said lock shaft rotatable therewith for completing the ignition circuit, a lever also carried by said shaft, pipes rigidly mounted at the sides of the casing and extending downwardly and forwardly along the frame, a bracket secured to said hood adjacent each side thereof, flexible wires connected with the lever on the lock shaft at one end and having their opposite ends provided with locking plungers adapted to engage the brackets on the hood for securing said hood in closed position said bracket having a plate adjustably carried thereby and having an opening therethrough for the reception of said locking plungers whereby the device may be applied to various types of automobiles without modification of the hood structure, substantially as set forth.

2. A locking device for automobiles comprising a switch housing mounted on the dash beneath the hood, a movable switch element in said housing, a lock mounted on the instrument board and having a shaft extending into and connected with the movable element of the switch, a casing for said shaft having one end fixed to said lock and having its other end connected to the switch housing, said switch housing and lock being non-rotatably mounted relative to said casing, pipes extending from said switch laterally and forwardly along the frame and terminating in close proximity to the lower edge of the hood, a locking element adjustably mounted on said hood, and flexible elements secured to the movable element of the switch and extending through said pipes for movement into engagement with said locking elements for securing the hood in position, substantially as set forth.

3. The combination with an automobile of a switch mounted beneath the hood, a shaft extending through said switch, locking means for rotating said shaft, a disk of insulating material non-rotatably mounted on said shaft, a bridge-piece carried by said disk, said bridge-piece forming a movable element of the switch, an elongated bar having a central perforation through which said shaft extends said bar having slots in its arms on opposite sides of the central perforations, pins disposed in said slots, locking elements having their inner ends disposed around said pins and having their outer ends disposed without the switch, said pins being adapted to slide in said slots and project and retract said locking elements when the shaft is oscillated, substantially as set forth.

4. An automobile ignition and hood locking device comprising a switch housing mounted on the dash beneath the hood, a movable switch element in said housing, a lock mounted on the instrument board and having a shaft extending into and connected with the movable element of the switch, a casing for said shaft having one end fixed to said lock and having its other end fixed to the switch housing, locking elements adjustably connected to the side of the hood, and flexible elements connected to the movable element of the switch extending longitudinally of the frame and arranged to engage said locking elements for locking the hood in closed position whereby when the key on the instrument board is turned to break the ignition circuit said flexible elements will be moved into engagement with the locking elements to lock the hood in closed position, substantially as set forth.

5. The combination with an automobile of a switch casing mounted beneath the hood, a lock secured in position with a key-way exposed at the front of the instrument board, a shaft fixed to said lock and extending into said switch casing, a hardened tube non-rotatably connecting said switch casing and said lock, a pair of flexible contact members in said switch casing, a disk rotatably mounted in said casing and having a bridge piece for completing the circuit across said flexible contact members, a bar fixed on the end of said rod, flexible wires secured to said bar, locking plungers at the outer ends of said flexible wires, and locking elements mounted on said hood adapted to be engaged by said locking plungers, substantially as set forth.

6. In an automobile the combination of a locking bolt extending from the instrument board through the dash, a lock mounted on the instrument board and adapted to receive a key for rotating said locking bolt, a casing for protecting said locking bolt said casing being fixed to said lock secured in the instrument board and having its forward end provided with a connection to the dash beneath the hood, a disk of insulating material non-rotatably mounted on said locking rod forwardly of the dash, a bridge-piece carried by said disk, a casing for said disk of insulating material comprising a body open at each end and having an intermediate web perforated for the reception of said locking bolt, a pair of spring fingers mounted on said web and bearing against said insulated disk whereby when the locking bolt is rotated the bridge-piece will bridge said spring fingers, a bar secured on the forward end of said locking rod on the opposite side of the web from said spring fingers, openings in said casing adjacent said bar, locking elements on said hood, and flexible elements connected to the extremities of said bar and extending through the openings in the casing to position to engage the locking elements for the hood whereby when the locking shaft is rotated the circuit will be completed across said spring fingers and the bar will be operated to reciprocate the flexible elements longitudinally into locking engagement with the locking elements on the hood, substantially as set forth.

In witness whereof, I have hereunto set my hand at Indianapolis, Indiana, this 27th day of September, A. D. nineteen hundred and twenty-eight.

PETER C. PINKERTON.